Aug. 7, 1934.   N. C. L. BROWN   1,969,060
RAILWAY TRAFFIC CONTROLLING SYSTEM
Original Filed Feb. 6, 1929
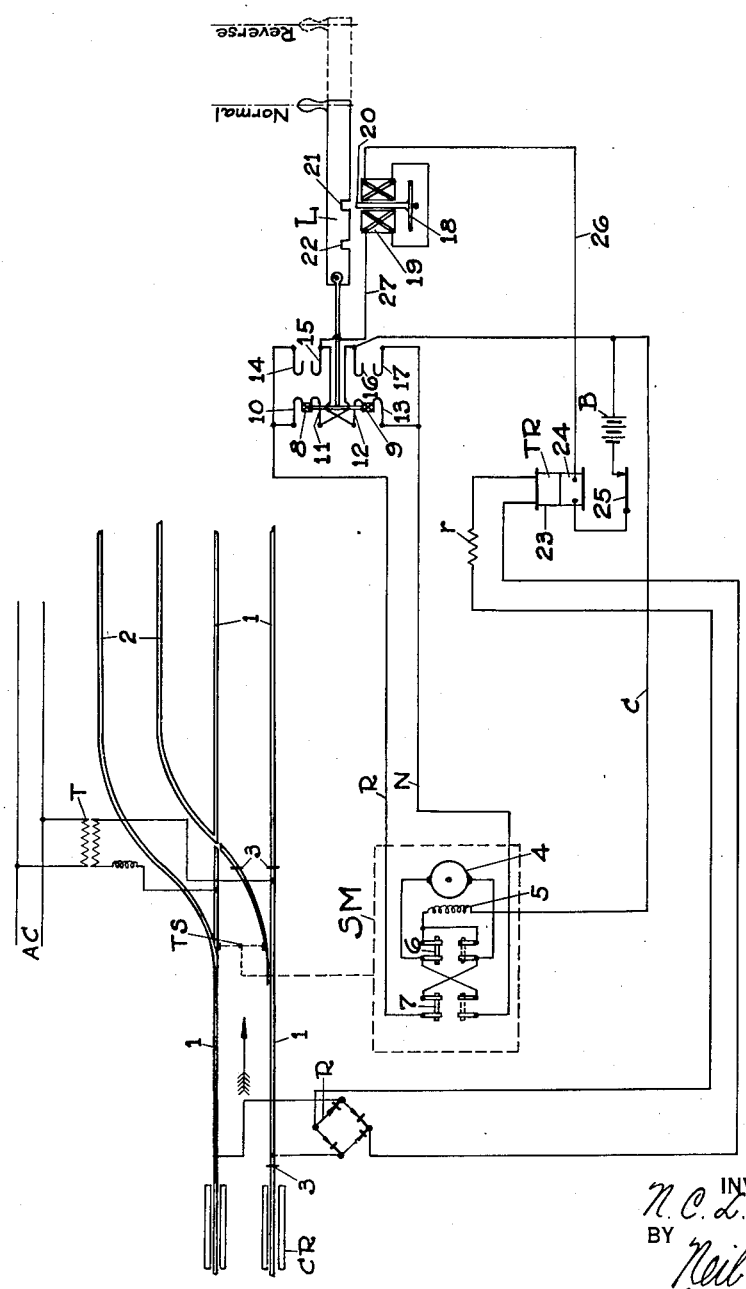
INVENTOR
N. C. L. Brown,
BY Neil D. Preston,
his ATTORNEY Patented Aug. 7, 1934

1,969,060

UNITED STATES PATENT OFFICE 1,969,060

RAILWAY TRAFFIC CONTROLLING SYSTEM

Ned C. L. Brown, Scottsville, N. Y., assignor to General Railway Signal Company, Rochester, N. Y.

Application February 6, 1929, Serial No. 337,826
Renewed November 25, 1932

16 Claims. (Cl. 246—138)

This invention relates in general to detector track circuits, and has more particular reference to such a circuit as used in connection with a turn-out track switch and a track brake type car retarder and arranged to prevent throwing of the track switch under a car.

In classification yards it is always most desirable to economize in space, and where a car retarder of the track brake type is employed to decrease the speed of a car before shunting it through a track switch onto a turn-out track, it is necessary for safety to provide a section of track between the exit end of the retarder and the track switch. This track section must be long enough, depending on the speed of the car leaving the retarder, to cause sufficient time to be required for the car to traverse the section, to allow for the initiation of a switch machine for operating the track switch, and the completion of the operation of the switch machine, whereby to insure the throwing of the track switch, before it is reached by the car. If the switch machine is provided with means, such as having its common energizing wire run through the front point of a track relay, to insure that the switch machine cannot be initiated during occupancy of the said track section, then this track section must be long enough to care for the time of operation of the switch machine and also for the time required for the track relay to respond to the axle shunt produced by occupancy of the track section, to release.

Unless the track section between the car retarder and the turn-out switch be long enough, as defined above, the track switch can be energized so tardily, (as, for instance, after occupancy, but before release of the track relay) as to result in the track switch being thrown underneath a car.

Accordingly, it results from the above that the faster acting the track relay is, the shorter can safely be the track section referred to, other things being equal, and hence the greater the economy in space.

It is usual in classification yards to have alternating current available and if the track circuits be energized by alternating current and an alternating current track relay be employed, a considerable increase in cost is involved in using an alternating current relay rather than a direct current relay of the usual simple tractive type. In addition to desiring to save expense in relays, some means is desirable for speeding up the release of the relays when shunted by car axles, whereby to economize in yard space, as described above.

With the above and other considerations in mind, it is proposed, in accordance with the present invention, to employ in connection with a switch machine for operating a track switch spaced some distance along the track from the exit end of a track brake type of car retarder, a direct current tractive, or other, type track relay controlling flow of energizing current to the switch machine. The track relay is to be connected to a detector track circuit through a rectifier, the track circuit being supplied with alternating current from any convenient available source. In this manner the use of relatively expensive alternating current relays is avoided, and a more rapid response of the track relay to the shunting effect, as explained below, of a car is obtained. As a result, the turn-out track switch can be safely located a considerably shorter distance from the exit end of the car retarder than if an alternating current track relay were employed, and the rectifier omitted.

Further objects, purposes and characteristic features of the invention will appear as the description progresses, reference being had to the accompanying drawing showing, in a wholly diagrammatic manner, and not in any manner in a limiting sense, one form which the invention can assume.

The single figure of drawing represents diagrammatically one form of applicant's invention.

Referring now to the drawing, a stretch of main track is shown constituted by track rails 1, with a turn-out track constituted by track rails 2, controlled by a track switch TS. The track rails 1 are furnished with insulating joints 3 for defining a detector track section. At the entrance end to the detector track section, travel being in the direction of the arrow, is a car retarder CR, which is of the usual track brake type and can be as shown in the patent to Hannauer No. 1,612,865 of January 4, 1927.

A source A. C. of alternating current is connected, through a transformer T, to supply alternating current to the detector track section.

For operating the track switch TS, a switch machine SM is employed, which can be of a usual form such, for example, as shown in the patent to Howe No. 1,605,546 of November 2, 1926, and includes an armature 4, a field 5, and movable contacts 6 and 7, which are operated in a usual manner by the switch machine, to set up normal and reverse energizing circuits.

Located at any convenient point, as in a signal tower, is a lever L, interlocked with other levers if desired, arranged for manual operation, or automatic operation as by means of an electric motor energized upon the occurrence of any desired happening, energizing circuits for the switch machine SM. This lever L can be reciprocated in a usual manner to move contacts 8 and 9 so as to bridge across fixed contacts 10—11, 12—13 or fixed contacts 14—15, 16—17 respectively, whereby to control the switch machine, as described in greater detail below.

The lever L is provided with a lever latch 18 having an actuating coil 19 and a detent 20 for engaging in one or the other of the locking notches 21 and 22 provided in lever L, when coil 19 is energized.

For preventing initiation of the switch machine SM during occupancy of the detector track section, there is provided a track relay TR having two windings 23 and 24, the winding 23 being energized with uni-directional current through a rectifier of any character, but preferably a double wave rectifier R inserted between the relay and the track circuit including track rails 1 whereby the alternating current supplied by the secondary of the transformer and to the track circuit of the detector track section operates to energize the direct current relay TR through its winding 23 when the detector track section is unoccupied.

The winding 24 of relay TR can be energized from any source, A. C. or D. C., of electrical energy, as for example, a battery B through a contact finger 25 and front point of relay TR, the battery B being the source of energy for operating the switch machine SM when proper circuits are completed.

The usual track relay, when shunted by a car axle, is slow to release, because the car axle short circuits the relay winding through a very low resistance path, whereby the speed of decay of flux in the relay core is greatly decreased. With a rectifier, such as R, inserted as shown, the relay short circuit includes the rectifier, and with a rectifier (as for example a dry plate type of the copper oxide type) having the characteristic of passing only a negligible current at voltages below a critical value, but a large current at voltages above the critical value, it is seen that constants can be so adjusted as to have the usual short circuit of the relay winding become practically an open circuit. In such circumstances, the release of the track relay on occupancy of its block is very prompt, with a resultant distinct advantage when used in connection with a retarder and turn-out track switch.

With one dry plate rectifier used, having characteristics such that below 3 volts practically no current is passed by the rectifier, but above 3 volts a relatively large current is passed, it was found that the response of a D. C. track relay to axle shunting was speeded up from a drop-away time of .65 seconds for a D. C. supply, to one of .1 seconds for an A. C. supply connected to the relay through a rectifier.

A further advantage of this arrangement of alternating current track circuit, rectifier, and D. C. relay is that it is practical to use a higher voltage across the track relay than in the case of D. C. track circuits. This permits using a much higher resistance in the energizing circuit of the track relay, either in the relay coil or in other parts of the circuit than could be used in the case of D. C., (low voltage) track circuits. As a result, better shunting of the track relay is obtained, and due to the higher resistance in the relay circuit, the flux in the relay coil dies away very quickly and hence the relay releases very quickly. This is because the dying flux in the relay coil induces a voltage which tends to cause a flow of current in a direction to maintain this flux. But due to the high resistance, but little induced current can flow, and hence this flux dies away very rapidly.

In the drawing is shown a resistance $r$, inserted in the energizing circuit of relay TR, for the purpose set forth above, and this resistance can be varied to suit the circumstances.

The usual procedure in a classification yard, in connection with classifying cars, is to pass a car through a retarder as CR, to decrease the speed of the car sufficiently that it can pass through a track switch as TS and take a turn-out track as 2.

Assume now that it is desired to shunt a car from the tracks 1, through the track switch TS and onto the tracks 2, and that an operator in the signal tower where the control lever L, the battery B, and the relay TR are all located, moves the lever to the right as viewed in the drawing, so as to cause contacts 8 and 9 to bridge contacts 14—15, 16—17. If this actuation of lever L takes place prior to occupancy of the detector track section defined by the insulating joints 3, a circuit is completed through switch machine SM for operating track switch TS to reverse or turn-out position, which circuit can be traced as follows:—positive side of battery B, contact finger 25 and front point of relay TR, relay winding 24, wire 26, coil 19, wire 27, contacts 15, 8 and 14, reverse wire R, switch machine contact 7, armature 4, switch machine contact 6, field 5, common wire C, to the negative side of battery B. The section of track between the car retarder CR and the track switch TS is designed to be long enough to give the switch machine sufficient time to complete its operation and have the track switch TS thrown and locked in the usual manner in reverse position, before the car can reach it.

As soon as the above traced circuit is completed, the coil 19 is energized with the result that the detent 20 engages in notch 22 of lever L and thus prevents return movement of the lever L, (until after the machine has completed its stroke) should the tower man, because of a change of mind, or for any other reason, attempt to return the lever. Thus there is avoided any danger of throwing the switch TS beneath a car due to a change on the part of the lever operator.

Upon the switch machine SM completing its cycle of operation, the movable contacts 6 and 7 are moved to their dotted line positions, to thereby break the reverse energizing circuit through the switch machine and at the same time de-energize the coil 19 to thus permit detent 18 to drop under the force of gravity and unlock the lever L so as to restore it to condition for operation to the left, as viewed in the figure of drawing, at a subsequent time.

Upon the switch machine SM moving its contacts 6 and 7 to the dotted line positions, the armature and field of the switch machine are connected up in a short circuit, to thereby effectually snub the switch machine and bring it quickly to a standstill, the snubbing circuit being traceable from armature 4, contact 6 in its dotted line position, field 5, common wire C, contacts 16, 9 and 17, normal wire N, switch machine contact 7 in its dotted line position, and back to the other side of armature 4.

If the towerman is tardy in operating the lever L, and moves it from its shown position, to the right, after the detector track circuit is occupied and the quick acting relay TR has released its contact finger 25, due to having its coil 23 shunted out by the occupying car, the reverse energizing circuit for switch machine SM, traced above, is not completed, but is open at contact finger 25 of relay TR. As a result the switch machine SM remains de-energized, and all possibility of throwing the track switch under a car is avoided.

If lever L be moved, from its normal (shown) position, toward the right so as to complete the reverse energizing circuit for switch machine SM, just prior to occupancy of the detector track circuit and release of relay TR, subsequent occupancy of the detector track circuit cannot operate to cause relay TR to release its contact finger 25, since the reverse energizing circuit for the switch machine, as traced above, includes the relay holding winding 24 in a stick circuit including contact finger 25 and front contact of the relay, whereby de-energization of winding 23 does not de-energize the relay TR.

The operation of the system, when operating the switch from reverse to normal, takes place in the same manner as described above, and should not require detailed explanation.

To summarize the operation of the system above described, it will be seen that the lever L must be actuated prior to release of relay TR in order to initiate the switch machine, that if once so energized, subsequent occupancy of the detector track circuit does not interfere with the completion of the switch machine operation, that the locking member 18 for lever L prevents the operator from reversing the switch machine in mid-stroke, and that this locking means 18 is released after completion of the operation of the switch machine, and a snubbing circuit is completed which quickly brings the switch machine to a standstill.

Furthermore, as brought out in the introductory portions of the specification, the detector track circuit included between the insulating joints 3 can safely be made considerably shorter, by using the relay and rectifier as described, instead of an A. C. relay. Thus the employment, in connection with a car retarder in a classification yard, of an alternating current track circuit supplying a direct current track relay through suitable rectifying means, effects very desirable economy in yard space and hence constitutes a decided improvement in systems of the type in question.

The above rather specific description of one form of the present invention is given solely by way of illustration, and is not intended, in any manner whatsoever, in a limiting sense. Obviously, the invention can assume many different physical forms, and is susceptible of numerous modifications, and all such forms and modifications are intended to be included in this application, as come within the scope of the appended claims.

Having described my invention, I now claim:—

1. In classification yards, in combination, a stretch of track including a track brake and a turn-out switch spaced from each other, a detector track section including the rails between said brake and switch, a source of alternating current connected to said track section, a track relay connected across said rails, a rectifier connected between said rails and said relay, a switch machine for operating said switch, and an energizing circuit for said machine controlled by said track relay.

2. In classification yards, in combination, a stretch of track, a track brake in said track, a turn-out switch in said track and spaced from said brake, a detector track section including the rails between said brake and switch, a source of alternating current connected to said track section, a track relay connected across said rails, a rectifier connected between said rails and said relay, a switch machine for operating said switch, and energizing circuits for energizing said machine in normal and reverse directions both controlled by said track relay.

3. In classification yards, in combination, a stretch of track, a track brake in said track, a turn-out switch in said track and spaced from said brake, a detector track section including the rails between said brake and switch, a source of alternating current connected to said track section, a track relay connected across said rails, a rectifier connected between said rails and said relay, a switch machine for operating said switch, energizing circuits for energizing said machine in normal and reverse directions both controlled by said track relay, a control lever movable to complete said normal and reverse circuits for said switch machine when said track relay is picked up, and means preventing movement of said lever during operation of said switch machine.

4. In classification yards, in combination, a stretch of track including a track brake and a turn-out switch spaced from each other, a detector track section including the rails between said brake and switch, a source of alternating current connected to said track section, a track relay connected across said rails, a relatively high resistance and a rectifier connected between said rails and said relay, a translating device for operating said switch and a control circuit for said device controlled by said track relay.

5. In classification yards, in combination, a stretch of track, a track brake in said track, a turn-out switch in said track and spaced from said brake, a detector track section including the rails between said brake and switch, a source of alternating current connected to said track section, a track relay connected across said rails, a relatively high current limiting means and a rectifier connected between said rails and said relay, a switch machine for operating said switch, and energizing circuits for energizing said machine in normal and reverse directions both controlled by said track relay.

6. In combination, a stretch of track, a track switch, a switch machine for operating the track switch, a detector track section, a track relay connected across the rails of the track section, a source of energy for the switch machine, and a stick circuit for the track relay which includes said source of energy.

7. In combination, a stretch of track, a track switch, a switch machine for operating the track switch, a detector track section, a track relay connected across the rails of the track section, a source of energy for the switch machine, and a stick circuit for the track relay which includes said source of energy, a lever for controlling the switch machine, and an electrically operated latch for the lever included in said stick circuit.

8. In combination, a stretch of track, a track switch, a switch machine for operating the track switch, a detector track section, a track relay connected across the rails of the track section, a source of energy for the switch machine, and a stick circuit for the track relay which includes said source of energy, a lever for controlling the switch machine, and an electrically operated latch for the lever, arranged to lock the lever in normal or in reverse position when energized, included in said stick circuit.

9. In combination, a stretch of track, a track switch, a switch machine for operating the track switch, a lever for controlling the switch machine, a latch for locking the lever when energized, a source of energy for the switch machine, and an energizing circuit for the latch which includes the said source of energy and when once closed cannot be opened by movement of the lever.

10. In a system for use on railroads and the like, in combination, a track brake and a turnout switch spaced from each other, a detector track circuit between the brake and switch and including a source of alternating current and a track relay, an asymmetric unit connected between the source and the relay, a translating device for operating the switch, and an energizing circuit for the device controlled by the track relay.

11. A track switch, a switch machine for operating the switch, a lever movable to either of two positions to control the switch machine, a latch for locking the lever in either of the two positions against all movement, and means for releasing the latch only if the switch machine has completed its stroke.

12. A track switch, a switch machine for operating the switch, a lever movable to either of two positions to control the switch machine, a latch for locking the lever in either of the two positions, a source of energy for the switch machine for operating it to either of two extreme positions and arranged to prevent making the latch ineffective so long as the switch machine is not in an extreme position.

13. In combination with a track switch and switch machine for operating the same, a detector track circuit adjacent the switch and including a track relay, a lever, having two positions only, for controlling the switch machine, to each of two extreme positions, a latch for locking the lever in each of its two positions and controlled by said relay, and a source of energy arranged to make the latch effective except when the switch machine is in an extreme position.

14. In combination with a track switch and switch machine for operating the same, a detector track circuit adjacent the switch and including a track relay, a lever, having two positions only, for controlling the switch machine to each of two extreme positions, a latch for locking the lever in each of its two positions, a source of energy arranged to make the latch effective except when the switch machine is in an extreme position, subject to control by the track relay, and stick means on the track relay energized from said source of energy.

15. In combination with a track switch and switch machine for operating the same, a detector track circuit adjacent the switch and including a track relay, a lever, having two positions only, for controlling the switch machine, to each of two extreme positions, a latch for locking the lever in each of its two positions, a source of energy arranged to make the latch effective except when the switch machine is in an extreme position, subject to control by the track relay, and stick means on the track relay energized from said source of energy, the switch machine being energized from said source of energy.

16. In combination with a track switch and switch machine for operating the same, a lever, having two positions only, for controlling the switch machine, to each of two extreme positions, a latch for locking the lever in each of its two positions, and a source of energy arranged to make the latch effective except when the switch machine is in an extreme position.

NED C. L. BROWN.